(12) United States Patent
Wright

(10) Patent No.: US 6,296,429 B1
(45) Date of Patent: Oct. 2, 2001

(54) MINE ROOF TENSION NUT HAVING IMPROVED FRANGIBLE QUALITIES

(75) Inventor: Raymond L. Wright, Syracuse, NY (US)

(73) Assignee: The Eastern Company, Naugatuck, CT (US)

(*) Notice: Subject to any disclaimer, the term of this patent is extended or adjusted under 35 U.S.C. 154(b) by 0 days.

(21) Appl. No.: 09/596,256

(22) Filed: Jun. 16, 2000

(51) Int. Cl.$^7$ .............................. F16B 31/00; F16B 37/14
(52) U.S. Cl. .................. 411/5; 411/3; 411/429; 411/432
(58) Field of Search ................. 411/2, 3, 5, 429, 411/432

(56) References Cited

U.S. PATENT DOCUMENTS

| | | |
|---|---|---|
| 680,991 | 8/1901 | Crosby . |
| 692,218 | 2/1902 | Anderson . |
| 1,456,215 | 5/1923 | Brightman . |
| 3,737,027 | 6/1973 | Ball . |
| 3,979,918 | 9/1976 | Vidler . |
| 4,183,699 | 1/1980 | Donan, Jr. et al. . |
| 4,295,761 | 10/1981 | Hansen . |
| 4,347,020 | 8/1982 | White et al. . |
| 4,662,795 | 5/1987 | Clark et al. . |
| 5,282,698 | * 2/1994 | Wright et al. ................ 411/3 X |
| 5,352,065 | * 10/1994 | Arnall et al. ................. 411/3 X |
| 5,873,689 | * 2/1999 | Mensour et al. .............. 411/3 |

* cited by examiner

*Primary Examiner*—Neill Wilson
(74) *Attorney, Agent, or Firm*—George R. McGuire; Hancock & Estabrook, LLP

(57) ABSTRACT

A nut for use with an elongated rod having one end anchored by a hardened resin grouting mix in a drill hole in a mine roof or other such rock formation. The nut has a body portion with a threaded bore through which the rod is advanced and a dome-shaped wall surrounding one end of the bore in radially outwardly spaced relation and an annular lip defining an opening in coaxial, axially spaced relation to the one end of the bore. A metal disc, either solid or with a central opening of smaller diameter than the bore, is positioned in covering relation to the bore and surrounded by the dome-shaped wall. As the rod is advanced through the nut, the disc is moved into contact about its entire periphery with the inside of the dome-shaped wall and rotation of the nut is transmitted to the rod to mix the resin components within the drill hole. After the mix hardens, excess torque applied to the nut deforms the nut toward the dome shape of the wall and eventually fractures the annular lip, thereby expanding the opening and expelling the disc. The torque required to fracture the nut is considerably higher when the disc is incorporated in the nut structure, thereby ensuring complete mixing of the resin components prior to fracture.

8 Claims, 3 Drawing Sheets

US 6,296,429 B1

MINE ROOF TENSION NUT HAVING IMPROVED FRANGIBLE QUALITIES

BACKGROUND OF THE INVENTION

The present invention relates to devices employed in reinforcement and support of rock structures, and more specifically to nuts having frangible portions for applying tension to threaded rods or bolts which are anchored in blind drill holes in rock formations such as mine roofs, and the like.

Among the means for effecting rock structure support and reinforcement are those wherein an elongated rod or bolt is installed in a blind drill hole bored in the formation. A breakable cartridge containing mutually isolated components of a resin grouting material is inserted into the hole, followed by one end of the rod. The cartridge is fractured against the end of the hole by advance of the rod, and the released resin components are mixed by rotation of the rod. A short time, e.g., a few seconds, after mixing the components harden to provide a secure anchor for the end of the rod within the drill hole.

In the usual situation, it is desirable to place the rod in tension in order to compress and reinforce the rock structure surrounding the drill hole. This may be done by threading a nut on the end of the rod outside the drill hole and rotating nut against a metal support or bearing plate. In order to permit mixing of the resin components and tensioning of the rod in a single operation, nuts have been provided with frangible portions so that the rod will rotate to mix the components in response to rotation of the nut, and the frangible portion will break upon application of excess torque to the nut after sufficient hardening of the grouting mix to apply the desired degree of tension to the rod.

Examples of so-called tension nuts which have been used in the past are shown and described later herein. The frangible portion of some nuts of this type is located in the threaded portion of the nut, raising the possibility that the threads may become fouled or damaged, resulting in malfunction or at least inconsistent operation of such nuts. In other types of tension nuts, the frangible portion may break before the resin components are thoroughly mixed, resulting in poor anchoring of the rod.

It is a principal object of the present invention to provide a novel and improved tension nut for use with a threaded rod in rock support and reinforcement applications.

Another object is to provide a mine roof bolt tension nut which ensures complete and thorough mixing of relatively large amounts of resin grouting components by rotation of an elongated rod upon which the nut is mounted.

A further object is to provide a nut having a frangible portion for fracture by a rod upon which the nut is threadedly secured by application of relatively high torque to the nut, and wherein the fracturing torque is relatively consistent from one nut to the next.

Other objects will in part be obvious and will in part appear hereinafter.

SUMMARY OF THE INVENTION

One of the most widely used tension nuts for mine roof support applications over the past 20-odd years is that made and sold by the Frazer and Jones Division of applicant's assignee under the trademark "Domenut." This tension nut is shown and described in U.S. Pat. No. 4,662,795 and includes the usual body portion having an internally threaded bore for engagement with the threaded end of a length of reinforcing bar, and an additional, dome-shaped wall surrounding one end of the threaded bore. An opening in the top of the dome-shaped wall is coaxial with, and of smaller diameter than the threaded bore in the nut. Thus, as the end of the bar is threaded into the nut, threaded advance is limited by contact of the end of the bar with the inside of the dome-shaped wall. After the resin mix has hardened sufficiently to prevent rotation of the rod by a torque sufficient to fracture the dome, continued rotation of the nut causes such fracture and permits further rotation to apply tension to the rod.

It has been found that in some anchoring applications, such as those requiring a relatively large amount of resin, the dome portion of the nut is fractured before the resin components have been mixed to the desired extent. That is, the components sometimes begin to harden before mixing is complete and this initial hardening is sufficient to retard rotation of the rod to an extent that the dome portion of the nut fractures. The nut may then be further rotated to apply tension to the rod, but anchoring of the rod is inadequate due to the incomplete mixing. Attempts to overcome the problem by thickening or otherwise reinforcing the dome section, as conventional wisdom would dictate, were largely unsuccessful.

The tension nut of the present invention adds to the prior art Domenut tension nut a metal disc or washer, inserted into the area above the threads and surrounded by the cylindrical portion which is later deformed by a die into the dome-shaped configuration. The disc is of smaller diameter than the inside diameter of the cylindrical portion, but greater than that of the opening in the dome. As the nut is threaded onto the rod, the end of the rod contacts the disc, causing the latter to contact the interior of the domed portion above the thread zone about the entire periphery of the disc. The rod will then be rotated together with the nut as the resin components are mixed. When mixing is complete, rotation is halted for a few seconds as the mixture hardens sufficiently to resist rotation of the rod against a torque great enough to cause the rod to distort the disc toward a dome shape and to fracture the dome portion of the nut and expel the disc. The nut is then torqued to the degree necessary to produce the desired tension in the rod.

The foregoing and other features of structure and operation of the tension nut of the invention will be more readily understood and fully appreciated from the following detailed disclosure, taken in conjunction with the accompanying drawings.

DETAILED DESCRIPTION

Figure 1A:
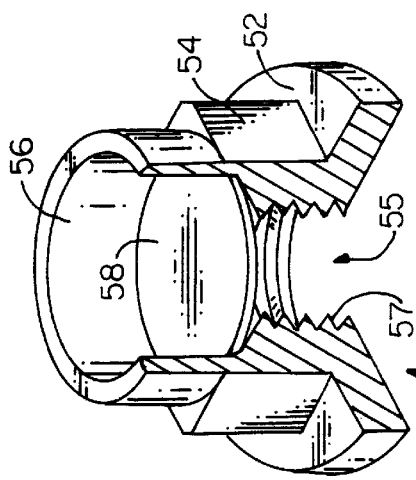
FIGS. 1a, 1b and 1c are perspective views, with portions broken away, of prior art nuts of the same general type as the present invention.

Referring now to the drawings, in FIG. 1a is shown a prior art tension nut 10 comprising body portion 12 and disc 14.

Body portion 12 includes section 16, having four sides for engagement by a wrench, integrally formed with cylindrical section 18. Central bore 20 extending axially through body portion 12, is tapped to provide threads 22 full length of bore 20. Disc 14, typically of aluminum, initially has a diameter less than the minor diameter of threads 22. The disc is positioned within bore 20, near one end thereof, and is engaged between a pair of punches (not shown) which compress the disc axially while expanding it radially into the threads.

In use, nut 10 is threaded onto the lower end of an elongated rod, the upper end of which is inserted, behind one or more resin cartridges, into a drill hole in a mine roof. As the rod is inserted the resin cartridge(s) break(s) and rotation of nut 10 produces rotation of the rod to mix the resin. After the resin has sufficiently hardened to prevent rotation of the rod, application of sufficient torque to nut 10 causes the rod to push disc 14 out of bore 20 and permits application of a predetermined torque to nut 10 resulting in a desired tension in the rod, thereby reinforcing rock strata in which the anchor (resin, rod, nut) is installed. As previously mentioned, problems sometimes arise in connection with prior art nuts of this type due to distortion or other damage to the threads as the disc is forced out the end of the nut.

Figure 1C:
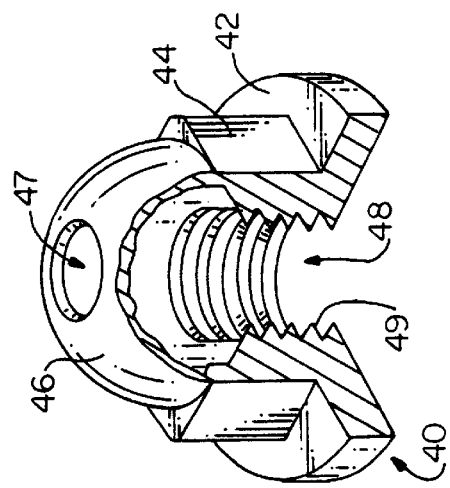
Figure 1B:
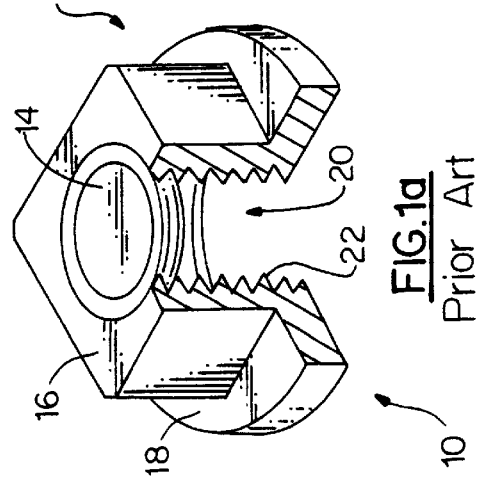

A second type of prior art tension nut, denoted generally by reference numeral 24, is shown in FIG. 1b. Nut 24 has six, flat, external sides, i.e., a uniform, hexagonal cross section, throughout its full length, and the lower portion of a through, axial bore 26 is tapped to provide threads 28. Threads 28 join the non-threaded, upper portion of bore 26 at shoulder 30. Metal disc 32, of slightly smaller diameter than the upper portion of bore 26, is placed upon shoulder 30 and a tool (not shown) of appropriate configuration is pushed downwardly from above the upper end (in the orientation of FIG. 1b) of nut 24 to form six tabs 34. Disc 32 is engaged between shoulder 30 and tabs 34. When a rod is advanced through threads 28 to contact disc 32, tabs 34 retain the disc in position until rotation of nut 24 is restrained sufficiently to cause fracture of one or more of tabs 34 and expel disc 32 from bore26. While tension nuts such as that of FIG. 1b operate satisfactorily under most circumstances, it is difficult to predict accurately the torque required to force the disc out of the nut because the disc is engaged at six distinct points about its periphery by the individual tabs which may not have uniform fracturing forces. That is, if one or two of the tabs are weaker than the others, fracture and expulsion of the disc may occur at a lower torque than desired.

FIG. 1c illustrates the tension nut of U.S. Pat. No. 4,662,795. This nut, indicated by reference numeral 40, includes three integrally formed sections, namely, a circular or cylindrical base 42, a body portion 44 of square cross section, and a dome-shaped wall 46 having an annular lip defining central opening 47. Bore 48 extends through the base 42 and body portion 44 and is tapped to provide threads 49. As explained in the referenced patent, a cylindrical flange portion is subjected to a shaping operation in which it is deformed from its originally cast shape into domed-shaped wall 46. In use, nut 40 is threaded on one end of an elongated rod which also carries a conventional bearing plate and the other end of the rod is inserted into a drill hole in a mine roof, or other strata requiring reinforcement, behind one or more resin cartridges. Advancement of the rod fractures the cartridge(s) and mixes the two, initially flowable resin components. After the resin has hardened sufficiently, further rotation of the rod is resisted to the extent of causing the rod to fracture the domed section of the nut and pass through the opening therein. A torque may then be applied to the nut sufficient to produce a desired degree of tension in the rod with concomitant reinforcement of the rock structure wherein it is installed. However, as pointed out earlier herein, when relatively long rods or bolts are installed with substantial amounts of resin, the end of the rod may fracture and pass through the dome before the resin has been sufficiently mixed and hardened.

Figure 2:
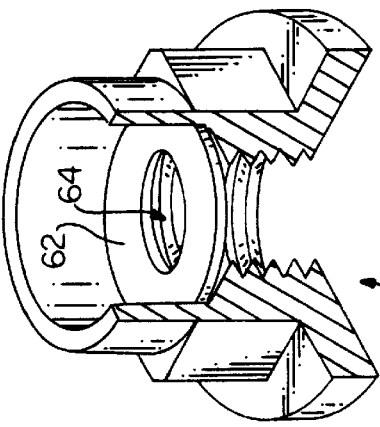
FIGS. 2 and 3 are perspective views, with portions broken away, of two embodiments of the tension nut of the present invention at an intermediate stage of fabrication.
Figure 3:
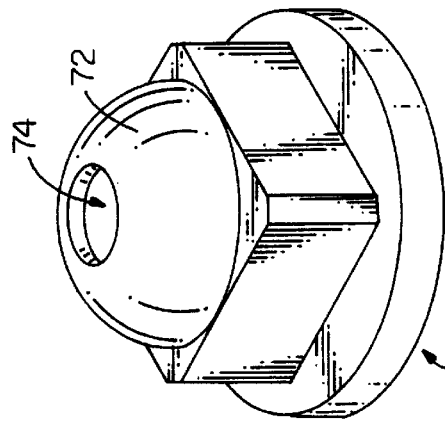
Figure 4:
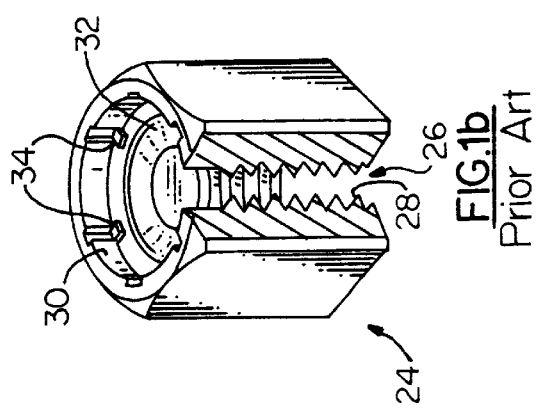
FIG. 4 is a perspective view of the nut of the invention in fully fabricated form.

This problem is effectively overcome by the nut of the present invention, shown in first and second embodiments (both in partly fabricated form) in FIGS. 2 and 3, and in fully fabricated form in FIG. 4. Nut 50 of FIG. 2 includes integral base and body sections 52 and 54, respectively, and cylindrical flange 56. Central, through bore 55 is surrounded at one end by flange 56 and is tapped to provide threads 57. In the nut of the present invention, solid, circular disc 58, having a diameter slightly less than the inside diameter of flange 56 is placed on the surface of body section 54 prior to forming flange 56 into its final dome shape. Nut 60 of FIG. 3 is identical in all respects to nut 50 except for the substitution of washer 62, having central opening 64, for solid (diametrically continuous) disc 58. The exterior appearance of both nuts 50 and 60, as well as prior art nut 40, is shown in the fully fabricated nut 70 of FIG. 4 wherein dome portion 72 includes through opening 74 having a diameter less than that of threaded bore 55 extending through the base and body sections. As in the case of the prior art nut, the preferred fabrication of nut 70 is as a malleable iron casting which is pearlitized after forming of the domed portion.

Figure 7:
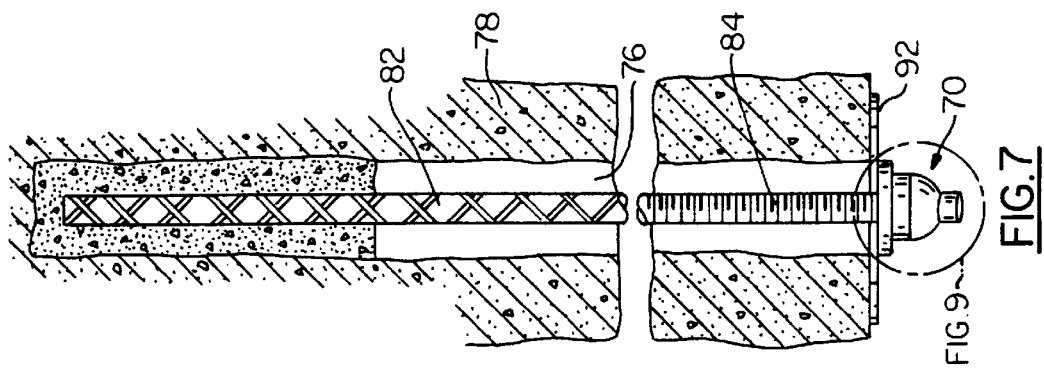
FIGS. 5, 6 and 7 are elevational views of a rock formation, shown in section, having a drill hole formed therein with a reinforcement and support system, including the tension nut of the present invention, shown in various stages of installation.
Figure 6:
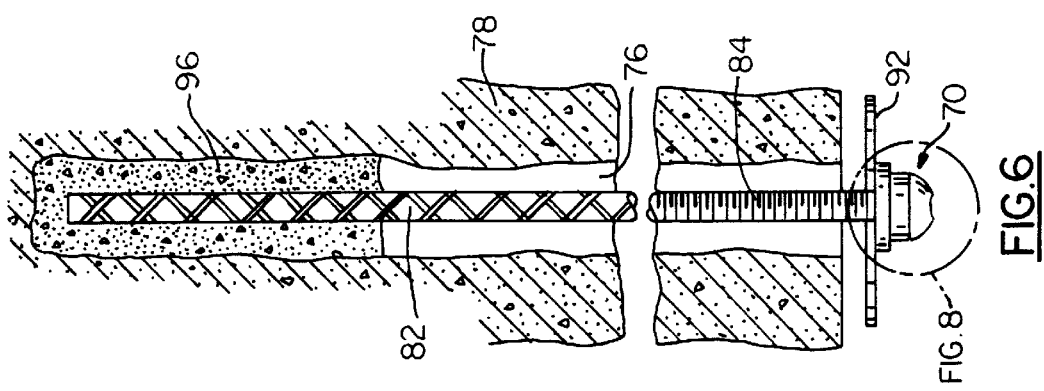
Figure 5:
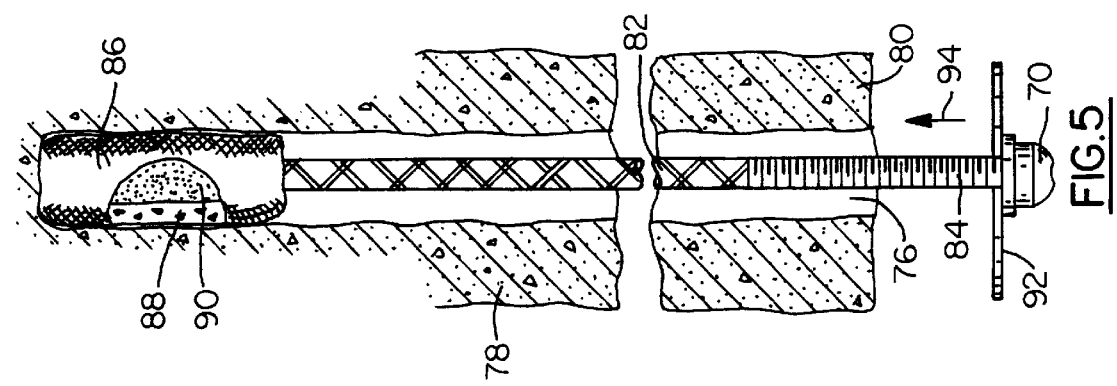

The use of the tension nut of the present invention to reinforce rock strata is illustrated in FIGS. 5, 6 and 7. Blind drill hole 76 is formed in rock strata 78, such as the roof of a coal mine, with conventional drilling tools for the purpose of installing elements which will serve to support surface 80 and generally reinforce the surrounding rock structure. Elongated steel bar or rod 82 is provided with threads 84 extending from one end for a portion of its length. Conventional resin cartridge 86 (or a plurality of such cartridges) is formed in two compartments physically separating components 88 and 90 of a resin grouting mix. The two components remain in a semi-liquid or thixotropic phase until mixed, whereupon the resin begins to solidify. Curing and solidification continue until an extremely strong bond is formed by the resin grout.

As seen in FIG. 5, cartridge 86 has been placed in drill hole 76 and has been pushed to the blind end of the hole by advance of rod 82 into the hole. Threaded end 84 extends outside the drill hole and passes through an opening in support plate 92 which is carried upon nut 70, threaded upon the end of rod 82. Rod 82 is moved upwardly, as indicated in FIG. 5 by arrow 94, to the position of FIG. 6 wherein plate 92 is in close proximity to the portion of surface 80 surrounding the open end of drill hole 76. Upward movement of rod 82 has fractured resin cartridge 86, allowing mixing of components 88 and 90. Nut 70 is engaged by a socket tool (not shown) such as employed in bolting machines commonly used in coal mines and elsewhere, which is power-driven to move rod 82 upwardly and rotate it at high speed by rotation imparted to nut 70.

Figure 8:
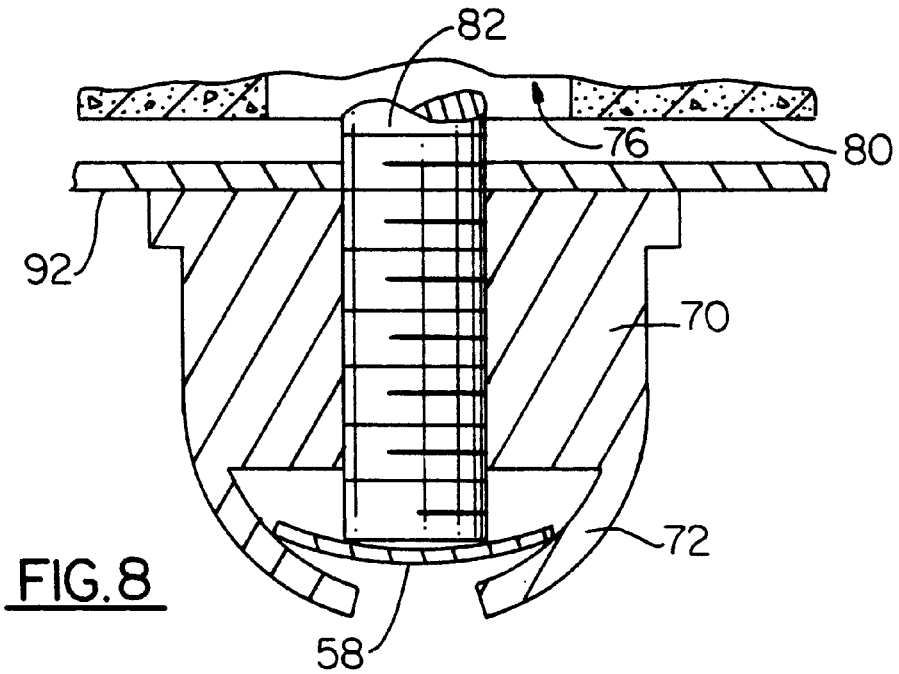
FIGS. 8 and 9 are enlarged portions of FIGS. 6 and 7, with the tension nut shown in section.
Figure 9:
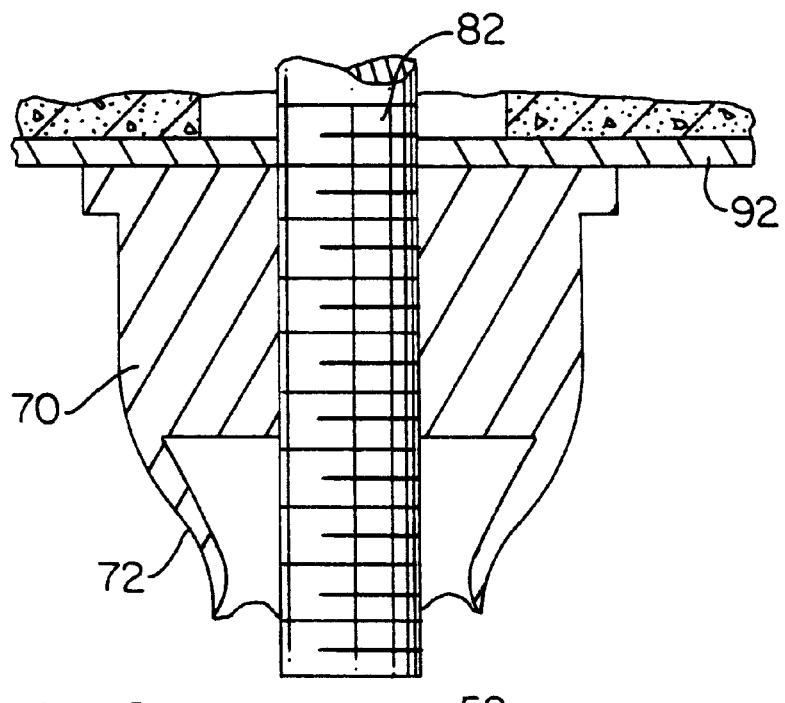

After inserting the threaded end of rod 82 through the opening in plate 92, nut 70 is threaded on the rod until the end of the rod engages disc 58 (or washer 62, depending on which embodiment is used), thereby preventing further threaded advance of the nut onto the rod and imparting rotation from the nut to the rod as the components are mixed. When mixing is complete, a few seconds after cartridge 86 is fractured and rod 82 rotated, rotation is stopped for a few seconds to permit the grouting mix to harden. Torque is then applied to nut 70 sufficient to rotate the nut while rod 82 remains stationary, held by the solidified mix, indicated in FIG. 6 by reference numeral 96. The entire periphery of disc 58 contacts the inside surface of domed wall 72 and, as excess torque is applied, disc 58 is distorted toward a domed shape, as shown in FIG. 8. Continued torque tending to advance nut 70 further onto threads 84 causes disc 58 to fracture domed portion 72 of nut 70, expelling the disc from the nut, as indicated in FIG. 9.

After fracture of the nut and expulsion of the disc, very little resistance to further rotation of the nut will be encountered and the amount of torque required to produce the desired degree of tension in rod 82 may be applied. The torque required to fracture the domed wall of the nut by means of peripheral forces applied by the disc or washer is significantly greater than that required to fracture the same portion with only the end of the rod. Tests have indicated that the breakout resistance (torque required to fracture the domed portion of the nut) is, on average, more than twice as high for nuts incorporating discs or washers than for the same nuts without discs or washers. The breakout resistance is very nearly the same for nuts with solid discs as for nuts with washers. Good results have been obtained using steel discs and washers having uniform thickness (0.091") and hardness (Rockwell B 56). A disc/washer that has been pushed through the domed portion of a nut by a rotating bolt or rod is permanently deformed to a saucer shape with an overall height approximately twice that of its original thickness. Installation time is essentially the same whether using a tension nut with or without a disc/washer. The outer diameter of the deformed disc/washer is increased by several thousandths of an inch. In any case, the nut of the present invention provides a practical and effective way to enhance the thoroughness of the mixing of resin components in the support and reinforcement of rock structures.

What is claimed is:

1. A tension nut for use with an elongated, threaded rod having a first diameter to mix components of a resin grouting mix within a drill hole of a rock formation and thereafter advance the nut on the rod to produce a desired degree of tension in the rod between one end, anchored in the drill hole by the grouting mix and the other ends, extending outside the hole with the nut threaded thereon, said nut comprising:
   a) a body portion having an internally threaded bore with first and second ends and said first diameter for threaded engagement with said rod;
   b) a dome-shaped wall extending from an integral attachment with said body portion in the plane of said second end of said bore where said wall encircles said bore at a second diameter, greater than said first diameter, said wall extending to an annular lip defining an opening coaxial with said bore and axially spaced from said second end thereof, said opening having a third diameter, smaller than said first diameter; and
   c) a circular, metal disc having a predetermined thickness and a fourth diameter, larger than said first and smaller than said second diameter, positioned at said second end of said body portion and having a periphery surrounded by said wall and unattached to either of said wall and said body portion, and being shaped in the form of a washer having a central opening formed therethrough and which is of a fifth diameter that is smaller than said first diameter.

2. The tension nut of claim 1 wherein said metal disc is diametrically continuous.

3. The tension nut of claim 1 wherein said body portion and wall are of malleable iron and said metal disc is of steel.

4. The tension nut of claim 1 wherein the dimensions and strengths of said wall and said metal disc are such that, upon advance of said rod into said first end and through said bore, said metal disc is moved by said rod into contact with the interior of said wall about the entire periphery of said disc and application of excess torque to further advance said rod through said bore deforms said nut toward a domed shape and fractures said wall about said annular lip to enlarge said opening and expel said metal disc from said nut.

5. A tension nut for use with an elongated, threaded rod having a first diameter to mix components of a resin grouting mix within a drill hole of a rock formation and thereafter advance the nut on the rod to produce a desired degree of tension in the rod between one end, anchored in the drill hole by the grouting mix and the other ends, extending outside the hole with the nut threaded thereon, said nut comprising:
   a) a body portion composed of malleable iron and having an internally threaded bore with first and second ends and said first diameter for threaded engagement with said rod;
   b) a dome-shaped wall composed of malleable iron and extending from an integral attachment with said body portion in the plane of said second end of said bore where said wall encircles said bore at a second diameter, greater than said first diameter, said wall extending to an annular lip defining an opening coaxial with said bore and axially spaced from said second end thereof, said opening having a third diameter, smaller than said first diameter; and
   c) a circular, metal disc composed of steel and having a predetermined thickness and a fourth diameter, larger than said first and smaller than said second diameter, positioned at said second end of said body portion and having a periphery surrounded by said wall and unattached to either of said wall and said body portion.

6. The tension nut of claim 5, wherein said metal disc is diametrically continuous.

7. The tension nut of claim 5, wherein said metal disc is in the form of a washer, having a central opening with a fifth diameter less than said first diameter.

8. The tension nut of claim 5, wherein the dimensions and strengths of said wall and said metal disc are such that, upon advance of said rod into said first end and through said bore, said metal disc is moved by said rod into contact with the interior of said wall about the entire periphery of said disc and application of excess torque to further advance said rod through said bore deforms said nut toward a domed shape and fractures said wall about said annular lip to enlarge said opening and expel said metal disc from said nut.

* * * * *